(12) United States Patent
Wang et al.

(10) Patent No.: US 12,432,456 B2
(45) Date of Patent: Sep. 30, 2025

(54) CRUISE METHOD AND APPARATUS OF A HEAVY PAN-TILT STORAGE MEDIUM, AND ELECTRONIC DEVICE

(71) Applicant: ZHEJIANG UNIVIEW TECHNOLOGIES CO., LTD., Hangzhou (CN)

(72) Inventors: Fei Wang, Hangzhou (CN); Yifei Sun, Hangzhou (CN); Junchao Yang, Hangzhou (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 56 days.

(21) Appl. No.: 18/690,927

(22) PCT Filed: Jul. 21, 2022

(86) PCT No.: PCT/CN2022/106939
§ 371 (c)(1),
(2) Date: Mar. 11, 2024

(87) PCT Pub. No.: WO2023/040457
PCT Pub. Date: Mar. 23, 2023

(65) Prior Publication Data
US 2024/0388803 A1    Nov. 21, 2024

(30) Foreign Application Priority Data
Sep. 15, 2021 (CN) .......................... 202111081079.1

(51) Int. Cl.
H04N 23/695    (2023.01)
H04N 7/18    (2006.01)

(52) U.S. Cl.
CPC ............. *H04N 23/695* (2023.01); *H04N 7/18* (2013.01)

(58) Field of Classification Search
None
See application file for complete search history.

(56) References Cited

U.S. PATENT DOCUMENTS 10,158,799 B2 * 12/2018 Eguchi .................... H02J 50/10
12,101,558 B2 * 9/2024 Li .......................... H04N 23/695
2004/0042783 A1 * 3/2004 Diana .................... F16M 11/18
                                                                    396/427

FOREIGN PATENT DOCUMENTS

CN    201262711 Y  *  6/2009
CN    108289196 A  *  7/2018 ............. H04N 7/185
(Continued)

*Primary Examiner* — Stefan Gadomski
(74) *Attorney, Agent, or Firm* — MASCHOFF BRENNAN (57) ABSTRACT

Provided are a cruise method and apparatus of a heavy pan-tilt, a medium, and an electronic device. The method includes the following steps: A starting preset position of the heavy pan-tilt performing a preset position cruise in a current unit rotation stage of a current pan-tilt cruise cycle is determined, where one unit rotation stage corresponds to one rotation; the starting preset position is taken as a stop starting point, and at least two stop preset positions of the heavy pan-tilt in the current unit rotation stage are determined from preset positions divided in advance, where two adjacent stop positions in the same unit rotation stage are spaced by a preset number of preset positions; and the heavy pan-tilt is controlled to rotate sequentially on the at least two stop preset positions of the current unit rotation stage.

18 Claims, 4 Drawing Sheets

---

Determine a starting preset position of a heavy pan-tilt performing a preset position cruise in a current unit rotation stage of a current pan-tilt cruise cycle, where one unit rotation stage corresponds to one rotation — S110

Take the starting preset position as a stop starting point, and determine at least two stop preset positions of the heavy pan-tilt in the current unit rotation stage from preset positions divided in advance, where two adjacent stop positions in the same unit rotation stage are spaced by a preset number of preset positions — S120

Control the heavy pan-tilt to rotate sequentially on the at least two stop preset positions of the current unit rotation stage and enter a next unit rotation stage of the current pan-tilt cruise cycle to rotate after one sequential rotation, where the minimum operating speed of the heavy pan-tilt rotating sequentially on the at least two stop preset positions is greater than or equal to the minimum operating speed required for the ink formation of a motor bearing — S130

(56) References Cited

FOREIGN PATENT DOCUMENTS

| CN | 110337623 | A | * | 10/2019 | ............... | G05D 3/12 |
| CN | 110347184 | A | * | 10/2019 | ............... | G05D 3/10 |
| JP | 2004015207 | A | * | 1/2004 | | |

* cited by examiner

CRUISE METHOD AND APPARATUS OF A HEAVY PAN-TILT STORAGE MEDIUM, AND ELECTRONIC DEVICE

CROSS REFERENCE TO RELATED APPLICATIONS

This is a National Stage Application filed under 35 U.S.C. 371 based on International Patent Application No. PCT/CN2022/106939, filed on Jul. 21, 2022, which claims priority to Chinese Patent Application No. 202111081079.1 filed on Sep. 15, 2021, disclosures of both of which are incorporated herein by reference in their entireties.

TECHNICAL FIELD

Embodiments of the present application relate to the field of pan-tilt service life extension technology, for example, a cruise method and apparatus of a heavy pan-tilt, a storage medium, and an electronic device.

BACKGROUND

At present, heavy pan-tilts are mostly used in large environments such as forests. In order to accurately monitor forest fire points, the operating speed of a pan-tilt is set to be greatly low. However, when the operating speed is less than the ultimate minimum operating speed of a motor bearing, the motor bearing is in a sliding friction state. In addition, the horizontal radial force of the heavy pan-tilt is excessively large. The oil film between a ball and a raceway surface is easy to break, resulting in insufficient local lubrication, causing the dry grinding damage of the bearing, and thus affecting the service life of the motor bearing.

In the related art, grease with high viscosity is used to increase the formation ability of the bearing oil film, to extend the service life of the motor bearing or reduce the tightness of a belt, to reduce the load force of a motor, and thus to extend the service life of the motor.

The use of the grease with high viscosity increases the costs of the motor bearing and cannot extend the service life of the motor if a device is online. The reduction of the tightness of the belt indicates that the preset position accuracy of the pan-tilt is reduced, which cannot meet the use requirements of the product.

SUMMARY

Embodiments of the present application provide a cruise method and apparatus of a heavy pan-tilt, a storage medium, and an electronic device. For the case where the low-speed operation of a motor bearing causes dry grinding damage, a software driving manner is provided, extending the service life of the motor, reducing after-sales service costs, guaranteeing the preset position accuracy of the pan-tilt, and meeting use requirements.

In a first aspect, embodiments of the present application provide a cruise method of a heavy pan-tilt. The method includes the steps below.

A starting preset position of the heavy pan-tilt performing a preset position cruise in a current unit rotation stage of a current pan-tilt cruise cycle is determined, where one unit rotation stage corresponds to one rotation.

The starting preset position is taken as a stop starting point, and at least two stop preset positions of the heavy pan-tilt in the current unit rotation stage are determined from preset positions divided in advance, where two adjacent stop positions in a same unit rotation stage are spaced by a preset number of preset positions.

The heavy pan-tilt is controlled to rotate sequentially on the at least two stop preset positions of the current unit rotation stage and enter a next unit rotation stage of the current pan-tilt cruise cycle to rotate after one sequential rotation, where a minimum operating speed of the heavy pan-tilt rotating sequentially on the at least two stop preset positions is greater than or equal to a minimum operating speed required for ink formation of a motor bearing.

In a second aspect, embodiments of the present application provide a cruise apparatus of a heavy pan-tilt. The apparatus includes a starting preset position determination module, a stop preset position determination module, and a rotation control module.

The starting preset position determination module is configured to determine a starting preset position of the heavy pan-tilt performing a preset position cruise in a current unit rotation stage of a current pan-tilt cruise cycle, where one unit rotation stage corresponds to one rotation.

The stop preset position determination module is configured to take the starting preset position as a stop starting point and determine at least two stop preset positions of the heavy pan-tilt in the current unit rotation stage from preset positions divided in advance, where two adjacent stop positions in a same unit rotation stage are spaced by a preset number of preset positions.

The rotation control module is configured to control the heavy pan-tilt to rotate sequentially on the at least two stop preset positions of the current unit rotation stage and enter a next unit rotation stage of the current pan-tilt cruise cycle to rotate after one sequential rotation, where a minimum operating speed of the heavy pan-tilt rotating sequentially on the at least two stop preset positions is greater than or equal to a minimum operating speed required for ink formation of a motor bearing.

In a third aspect, embodiments of the present application provide a computer-readable storage medium for storing a computer program, where when the program is executed by a processor, the cruise method of a heavy pan-tilt according to embodiments of the present application is implemented.

In a fourth aspect, embodiments of the present application provide an electronic device. The electronic device includes a memory, a processor, and a computer program stored in the memory and executable on the processor, where the processor, when executing the computer program, implements the cruise method of a heavy pan-tilt according to embodiments of the present application.

DETAILED DESCRIPTION

The present application is further described in detail hereinafter in conjunction with drawings and embodiments. It is to be understood that the embodiments described herein are intended to illustrate and not to limit the present application. Additionally, it is to be noted that to facilitate description, only part, not all, of structures related to the present application are illustrated in the drawings.

Before exemplary embodiments are discussed in more detail, it is to be noted that some of the exemplary embodiments are described as processing or methods depicted in flowcharts. Although multiple steps are described as sequential processing in the flowcharts, many of the steps may be implemented concurrently, coincidentally or simultaneously. Additionally, the sequence of the multiple steps may be rearranged. The processing may be terminated when operations are completed, but the processing may further have additional steps that are not included in the drawings. The processing may correspond to a method, a function, a procedure, a subroutine, a subprogram, or the like.

Figure 1:
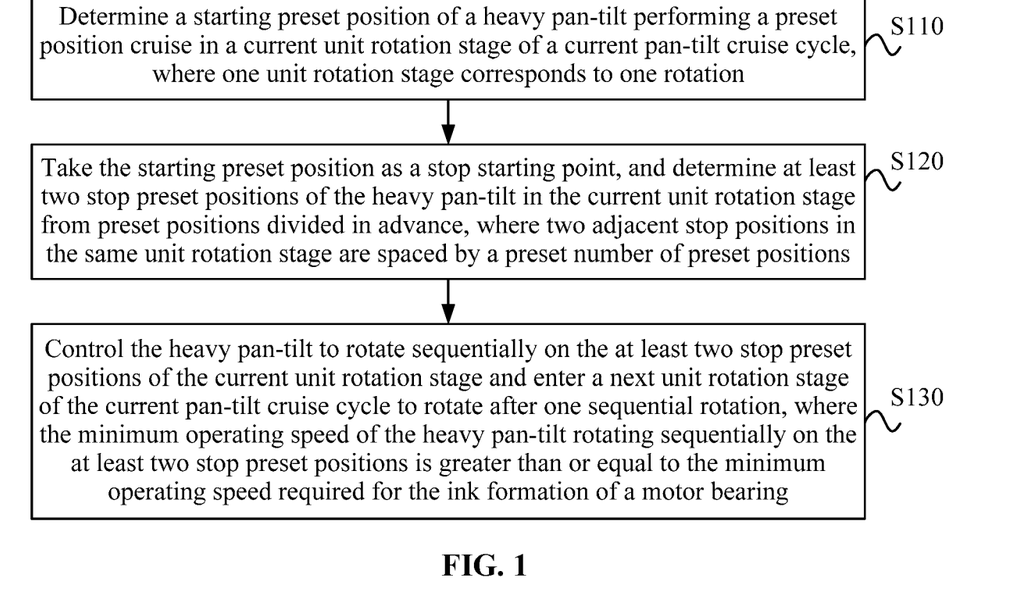
FIG. 1 is a flowchart of a cruise method of a heavy pan-tilt according to an embodiment of the present application.

FIG. 1 is a flowchart of a cruise method of a heavy pan-tilt according to an embodiment of the present application. This embodiment may be applicable to the case of extending the service life of the heavy pan-tilt. The method may be performed by a cruise apparatus of a heavy pan-tilt according to an embodiment of the present application. The apparatus may be implemented in software and/or hardware and may be integrated in a device such as an intelligent terminal for controlling the heavy pan-tilt.

As shown in FIG. 1, the cruise method of a heavy pan-tilt includes the steps below.

In S110, a starting preset position of the heavy pan-tilt performing a preset position cruise in a current unit rotation stage of a current pan-tilt cruise cycle is determined. One unit rotation stage corresponds to one rotation.

In this solution, a pan-tilt cruise cycle may refer to a cycle for controlling the heavy pan-tilt to perform cruise detection. One cruise cycle corresponds to all regions in a pan-tilt cruise shooting region. The current pan-tilt cruise cycle may refer to a cruise cycle of the pan-tilt at the current moment. The pan-tilt cruise shooting region may refer to a region for the heavy pan-tilt performing the cruise detection. The pan-tilt cruise shooting region may be, for example, a 360° region or a 180° region.

A unit rotation stage may refer to a stage for controlling the heavy pan-tilt to perform rotation detection in the pan-tilt cruise shooting region. One unit rotation stage corresponds to one circle of detection in the pan-tilt cruise shooting region. The current unit rotation stage may refer to a unit rotation stage when rotation detection is being performed at the current moment.

In this solution, the current pan-tilt cruise cycle includes a plurality of unit rotation stages. The detection in the current pan-tilt cruise cycle is not completed until the detection in all the unit rotation stages ends.

In this embodiment, the current unit rotation stage is composed of a plurality of preset positions. One of the preset positions may be taken as the starting preset position according to the requirements of the cruise detection. For example, the current unit rotation stage includes a first preset position, a second preset position, and a third preset position. In this case, the first preset position may be taken as the starting preset position. Alternatively, the third preset position may be taken as the starting preset position. The starting preset position may be set in advance.

For example, the pan-tilt cruise shooting region of the heavy pan-tilt is divided into a plurality of target regions. The size of each target region is configured through an operating angle corresponding to one rotation of the heavy pan-tilt. Each target region is sequentially provided with at least two preset positions.

In this embodiment, the pan-tilt cruise shooting region may be evenly divided into a plurality of target regions according to the operating angle of the heavy pan-tilt. Each target region is composed of at least two preset positions. For example, the pan-tilt cruise shooting region is 360°. The pan-tilt cruise shooting region is composed of 60 preset positions. In this case, the pan-tilt cruise shooting region may be divided into six target regions according to the operating angle. Each target region includes ten preset positions.

Figure 2:
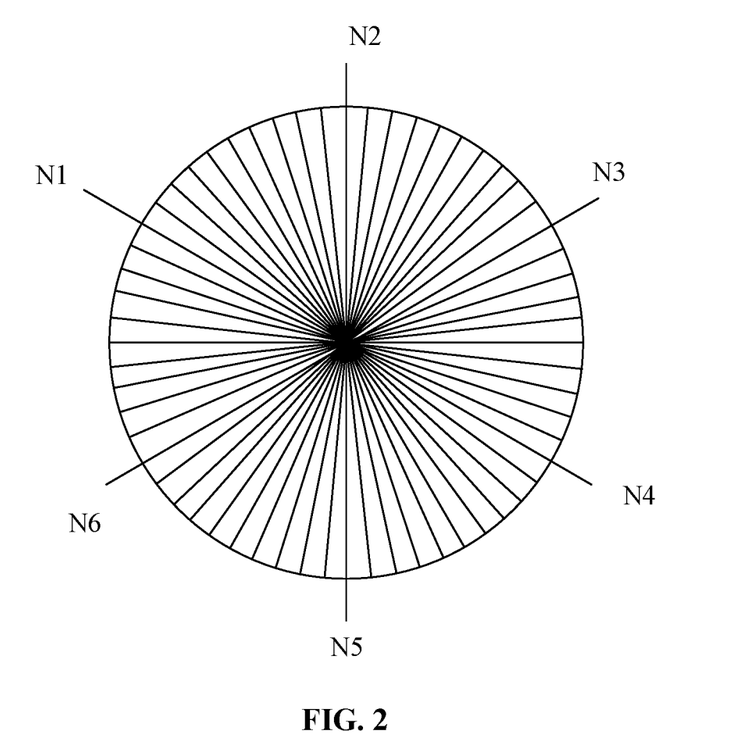
FIG. 2 is a structural diagram illustrating the division of a pan-tilt cruise shooting region according to an embodiment of the present application.

Exemplarily, FIG. 2 is a structural diagram illustrating the division of a pan-tilt cruise shooting region according to an embodiment of the present application. As shown in FIGS. 2, N1 to N6 represents target regions. Each small fan region represents a monitoring region when the pan-tilt runs, that is, a preset position. Each target region is composed of multiple preset positions sorted in sequence.

For example, the step in which the starting preset position of the heavy pan-tilt performing the preset position cruise in the current unit rotation stage of the current pan-tilt cruise cycle is determined includes the steps below.

If the current unit rotation stage is a first rotation stage of the current pan-tilt cruise cycle, a first preset position is selected from at least two preset positions sequentially set in a target region to serve as the starting preset position for performing the preset position cruise in the current unit rotation stage.

If the current unit rotation stage is a non-first rotation stage of the current pan-tilt cruise cycle, a preset position after a starting preset position for performing a preset position cruise in a previous unit rotation stage is selected from at least two preset positions sequentially set in a target region to serve as the starting preset position for performing the preset position cruise in the current unit rotation stage.

In this solution, one pan-tilt cruise cycle is composed of a plurality of unit rotation stages. One of these unit rotation stages is the first rotation stage, that is, a stage where the cruise detection is started. The remaining rotation stages are non-first rotation stages.

In this embodiment, if the current unit rotation stage is the first rotation stage of the current pan-tilt cruise cycle, a target region of the current unit rotation stage will be determined. A selected preset position in the target region is taken as the first preset position. For example, the current unit rotation stage is composed of target regions N1 to N6. Each target region is composed of preset position 1 to preset position 10. Preset position 1 of target region N1 may be selected as the starting preset position for performing the preset position cruise in the current unit rotation stage. The starting preset position for performing the preset position cruise in the current unit rotation stage may be set in real time or may be set in advance and determined by querying a directory.

In this solution, if the current unit rotation stage is a non-first rotation stage of the current pan-tilt cruise cycle, it will be determined which rotation stage of the current pan-tilt cruise cycle is acted as by the current unit rotation stage. The preset position after the starting preset position for performing the preset position cruise in the previous unit rotation stage is selected according to rotation stages to serve as the starting preset position for performing the preset position cruise in the current unit rotation stage. For example, the current unit rotation stage is a second rotation stage. The previous unit rotation stage is the first rotation stage. Preset position 1 of target region N1 may be selected as the starting preset position for performing the preset position cruise. Alternatively, preset position 2 of target region N1 may be selected as the starting preset position for performing the preset position cruise.

The arrangement of determining the starting preset position of the current unit rotation stage can implement the cruise detection of the pan-tilt cruise shooting region.

For example, the determination process of the operating angle includes the steps below.

A motor rotation acceleration curve of the heavy pan-tilt is acquired, and a rotation angle of the heavy pan-tilt is determined based on the motor rotation acceleration curve.

The operating angle is determined according to the rotation angle, the pan-tilt cruise shooting region, and a pan-tilt horizontal field angle.

In this solution, the rotation angle may refer to a rotation angle required for the operation and stop of the pan-tilt determined by the motor acceleration curve of the heavy pan-tilt. That is, the rotation angle is a rotation angle required when a motor accelerates from 0 to the minimum speed able to form the ink of the motor bearing and then reduces to 0.

The pan-tilt horizontal field angle may refer to a range that can be covered by a lens of the heavy pan-tilt.

In this embodiment, the operating angle needs to be greater than or equal to the rotation angle in order to guarantee that the heavy pan-tilt can operate according to a preset operating speed. Additionally, in order to avoid repeated monitoring, the operating angle needs to be set to an integer multiple of the pan-tilt horizontal field angle and is divisible by the pan-tilt cruise shooting region.

The operating angle is determined according to the rotation angle, the pan-tilt cruise shooting region, and the pan-tilt horizontal field angle, thereby improving the cruise speed, guaranteeing the formation of the ink of the motor bearing, extending the service life of the motor, and avoiding repeated monitoring.

In S120, the starting preset position is taken as a stop starting point, and at least two stop preset positions of the heavy pan-tilt in the current unit rotation stage are determined from preset positions divided in advance. Two adjacent stop positions in the same unit rotation stage are spaced by a preset number of preset positions.

In this solution, preset positions between two adjacent stop positions may be set according to the number of preset positions in a target region. For example, each target region includes ten preset positions. In this case, two adjacent stop positions in the same unit rotation stage may be spaced by ten preset positions.

In this embodiment, a stop preset position of the current unit rotation stage may be set according to the number of target regions. For example, the current unit rotation stage includes six target regions. In this case, six stop preset positions of the current unit rotation stage may be provided. That is, one preset position in each target region is selected to serve as a stop preset position. The space between two adjacent stop positions is the same.

In S130, the heavy pan-tilt is controlled to rotate sequentially on the at least two stop preset positions of the current unit rotation stage and enter a next unit rotation stage of the current pan-tilt cruise cycle to rotate after one sequential rotation. The minimum operating speed of the heavy pan-tilt rotating sequentially on the at least two stop preset positions is greater than or equal to the minimum operating speed required for the ink formation of the motor bearing.

In this embodiment, each stop preset position corresponds to one target region. The number of stop preset positions and the space between stop preset positions may be determined according to each target region of the current unit rotation stage The heavy pan-tilt is controlled to rotate sequentially in the current unit rotation stage so as to implement the detection of the pan-tilt cruise shooting region. When the heavy pan-tilt is controlled to rotate sequentially, the minimum operating speed of the heavy pan-tilt is greater than or equal to the minimum operating speed required for the ink formation of the motor bearing so as to extend the service life of the motor.

Figure 3:
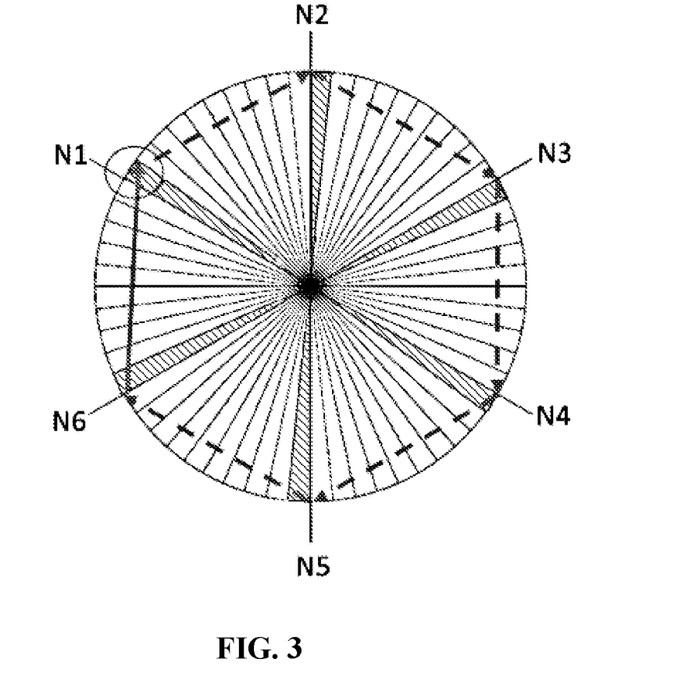
FIG. 3 is a diagram illustrating the heavy pan-tilt rotating sequentially in a current unit rotation stage according to an embodiment of the present application.
Figure 4:
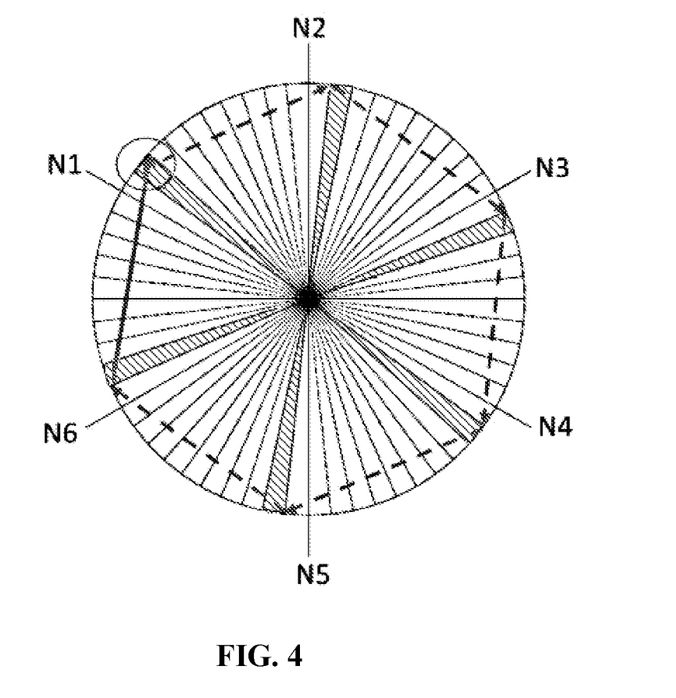
FIG. 4 is a diagram illustrating the heavy pan-tilt rotating sequentially in another current unit rotation stage according to an embodiment of the present application.
Figure 5:
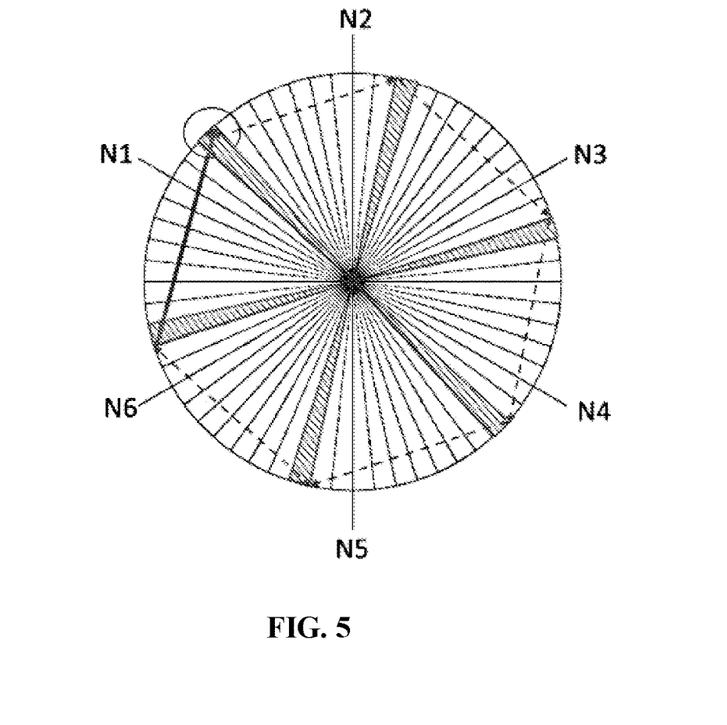
FIG. 5 is a diagram illustrating the heavy pan-tilt rotating sequentially in another current unit rotation stage according to an embodiment of the present application.

Exemplarily, FIG. 3 is a diagram illustrating the heavy pan-tilt rotating sequentially in a current unit rotation stage according to an embodiment of the present application. FIG. 4 is a diagram illustrating the heavy pan-tilt rotating sequentially in another current unit rotation stage according to an embodiment of the present application. FIG. 5 is a diagram illustrating the heavy pan-tilt rotating sequentially in another current unit rotation stage according to an embodiment of the present application. The pan-tilt cruise shooting region is composed of target regions N1 to N6. Each target region is composed of ten preset positions. The current pan-tilt cruise cycle includes ten unit rotation stages. A shaded part indicates a pan-tilt monitoring range under a preset position. A dotted line indicates an operating path of the heavy pan-tilt. A solid line indicates a last operating path of the heavy pan-tilt in the current unit rotation stage. A circle represents the starting preset position of the pan-tilt when operating in the current unit rotation stage.

As shown in FIG. 3, the current unit rotation stage is the first rotation stage. Stop preset positions are preset position 1 of target region N1, preset position 1 of target region N2, preset position 1 of target region N3, preset position 1 of target region N4, preset position 1 of target region N5, and preset position 1 of target region N6. Preset position 1 of target region N1 is set as the starting preset position.

As shown in FIG. 4, the current unit rotation stage is the second rotation stage. Stop preset positions are preset position 2 of target region N1, preset position 2 of target region N2, preset position 2 of target region N3, preset position 2 of target region N4, preset position 2 of target region N5, and preset position 2 of target region N6. Preset position 2 of target region N1 is determined as a starting preset position of the current unit rotation stage (second rotation stage) according to the starting preset position of the first rotation stage.

As shown in FIG. 5, the current unit rotation stage is a third rotation stage. Stop preset positions are preset position 3 of target region N1, preset position 3 of target region N2, preset position 3 of target region N3, preset position 3 of target region N4, preset position 3 of target region N5, and preset position 3 of target region N6. Preset position 3 of target region N1 is determined as a starting preset position of the current unit rotation stage (third rotation stage) according to the starting preset position of the second rotation stage.

In the first rotation stage, the heavy pan-tilt is controlled to rotate sequentially from preset position 1 of target region N1 to preset position 1 of target region N6. After the rotation ends, the heavy pan-tilt is controlled to enter the second rotation stage and rotate sequentially from preset position 2 of target region N1 to preset position 2 of target region N6. After the rotation ends, the heavy pan-tilt is controlled to enter the third rotation stage and rotate sequentially from preset position 3 of target region N1 to preset position 3 of target region N6. The rest can be done in the same way before the cruise detection of the ten unit rotation stages of the current pan-tile cruise cycle is completed entirely.

For the technical solution provided in this embodiment of the present application, the starting preset position of the heavy pan-tilt performing the preset position cruise in the current unit rotation stage of the current pan-tilt cruise cycle is determined; the starting preset position is taken as the stop starting point, and the at least two stop preset positions of the heavy pan-tilt in the current unit rotation stage are determined from the preset positions divided in advance; and the heavy pan-tilt is controlled to rotate sequentially on the at least two stop preset positions of the current unit rotation stage and enter the next unit rotation stage of the current pan-tilt cruise cycle to rotate after one sequential rotation. A software driving manner is provided by implementing this technical solution, thereby extending the service life of the motor, reducing after-sales service costs, guaranteeing the preset position accuracy of the pan-tilt, and meeting use requirements.

Figure 6:
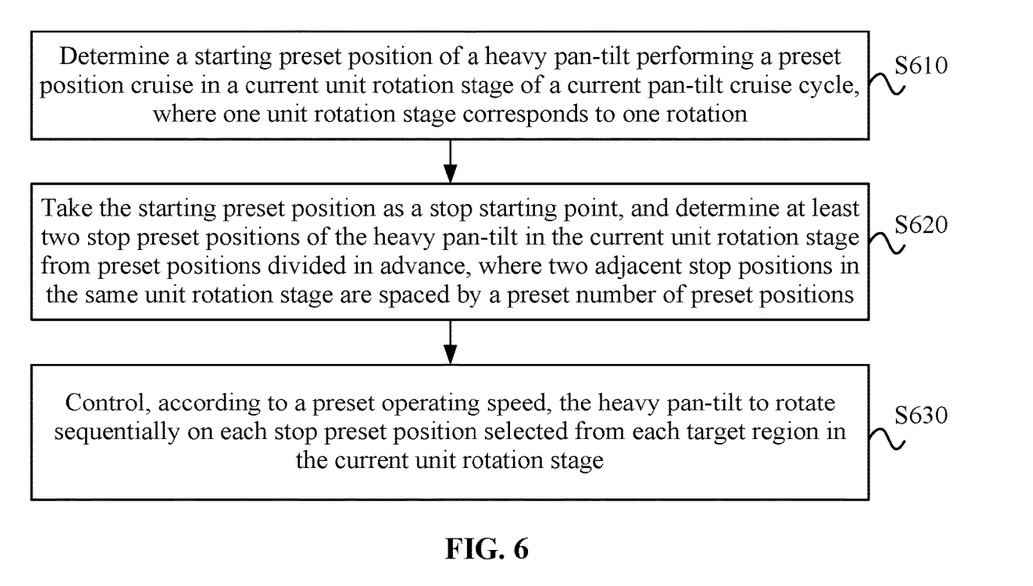
FIG. 6 is a flowchart of the cruise process of the heavy pan-tilt according to embodiment one of the present application.

FIG. 6 is a flowchart of the cruise process of the heavy pan-tilt according to embodiment one of the present application. This embodiment is a further refinement on the basis of the preceding embodiment. For example, the step in which the heavy pan-tilt is controlled to rotate sequentially on the at least two stop preset positions of the current unit rotation stage includes that the heavy pan-tilt is controlled according to a preset operating speed to rotate sequentially on each stop preset position selected from each target region in the current unit rotation stage. Reference is made to the preceding embodiments for the content not described in detail in this embodiment. As shown in FIG. 6, the method includes the steps below.

In S610, a starting preset position of the heavy pan-tilt performing a preset position cruise in a current unit rotation stage of a current pan-tilt cruise cycle is determined. One unit rotation stage corresponds to one rotation.

In S620, the starting preset position is taken as a stop starting point, and at least two stop preset positions of the heavy pan-tilt in the current unit rotation stage are determined from preset positions divided in advance. Two adjacent stop positions in the same unit rotation stage are spaced by a preset number of preset positions.

In S630, the heavy pan-tilt is controlled according to a preset operating speed to rotate sequentially on each stop preset position selected from each target region in the current unit rotation stage.

The operating speed may refer to the operating speed when the heavy pan-tilt performs cruise detection. An increase in the operating speed of the heavy pan-tilt can increase the formation speed of the ink of a motor bearing and extend the service life of a motor. The minimum operating speed of the heavy pan-tilt rotating sequentially on the at least two stop preset positions is greater than or equal to the minimum operating speed required for the ink formation of the motor bearing.

In this solution, the heavy pan-tilt is controlled according to the preset operating speed to rotate sequentially between each stop preset position of each target region, before stop detection is performed on stop preset positions of all the target regions of the current unit rotation stage, thereby implementing the detection of a cruise shooting region.

For example, the determination process of the operating angle includes the steps below.

The number of preset positions is determined according to a pan-tilt cruise shooting region and a pan-tilt horizontal field angle.

Target cruise time is calculated and obtained according to the number of preset positions, pre-determined preset position stop time, and operating time; and the preset operating speed is determined by using the target cruise time. The operating time includes the time of the heavy pan-tilt operating in the pan-tilt cruise shooting region. The target cruise time includes the time of the heavy pan-tilt performing cruise detection in a pan-tilt working region.

In this solution, the number of preset positions may be determined by dividing the pan-tilt cruise shooting region by the pan-tilt horizontal field angle. For example, the pan-tilt cruise shooting region is 360°, and the pan-tilt horizontal field angle is 6°. In this case, 60 preset positions are provided. That is, the pan-tilt cruise shooting region is composed of 60 preset positions.

In this embodiment, the time of preset position cruise detection may be obtained by multiplying the number of preset positions by the preset position stop time. The target cruise time may be obtained by adding the time of preset position cruise detection to the operating time. When the target cruise time does not meet detection requirements, the operating speed of the heavy pan-tilt may be adjusted according to the target cruise time. That is, the operating speed may be increased, and the target cruise time may be reduced. Alternatively, the operating speed may be reduced, and the target cruise time may be added. That is, the operating speed of the heavy pan-tilt may also be adjusted according to the requirements of the target cruise time. However, the minimum operating speed of the heavy pan-tilt needs to be greater than or equal to the minimum operating speed required for the ink formation of the motor bearing.

The determination of the operating speed of the heavy pan-tilt can increase the cruise speed, increase the ink formation speed of the motor bearing, extend the service life of the motor, and reduce after-sales service costs.

For example, the step in which the heavy pan-tilt is controlled to rotate sequentially on each stop preset position selected from each target region in the current unit rotation stage includes the steps below.

The heavy pan-tilt is controlled to move from a stop preset position selected from a current target region to a stop preset position selected from a next target region in the current unit rotation stage until the heavy pan-tilt moves from each stop starting point of each target region to each stop ending point of each target region. A stop ending point is configured to represent an ending preset position of the current target region.

A stop starting point may be a first stop preset position in a target region. A stop ending point may be a last stop preset position in a target region.

In this solution, each target region includes a stop starting point and a stop ending point. In the process of controlling the heavy pan-tilt to move from each stop starting point of each target region to each stop ending point of each target region, the heavy pan-tilt moves from a stop starting point selected from the current target region of the current unit rotation stage to a stop starting point selected from the next target region. After one sequential rotation, the heavy pan-tilt enters a next unit rotation stage of the current pan-tilt cruise cycle to rotate before moving from a stop ending point selected from the current target region to a stop ending point selected from the next target region.

For the technical solution provided in this embodiment of the present application, the starting preset position of the heavy pan-tilt performing the preset position cruise in the current unit rotation stage of the current pan-tilt cruise cycle is determined; the starting preset position is taken as the stop starting point, and the at least two stop preset positions of the heavy pan-tilt in the current unit rotation stage are determined from the preset positions divided in advance; and the heavy pan-tilt is controlled according to the preset operating speed to rotate sequentially on each stop preset position selected from each target region in the current unit rotation stage. A software driving manner is provided by implementing this technical solution, thereby extending the service life of the motor, reducing after-sales service costs, guaranteeing the preset position accuracy of the pan-tilt, and meeting use requirements.

Figure 7:
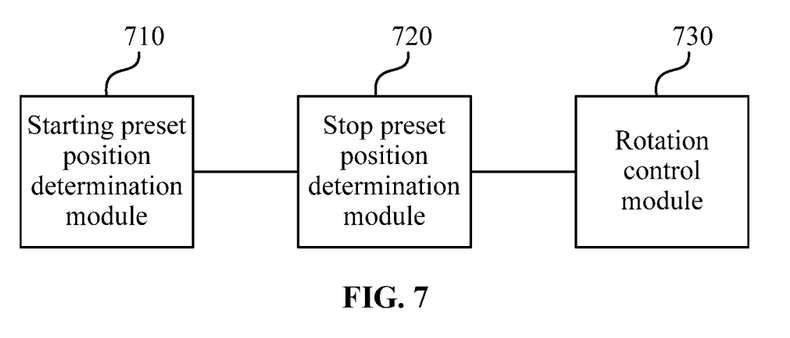
FIG. 7 is a structural diagram of a cruise apparatus of a heavy pan-tilt according to an embodiment of the present application.

FIG. 7 is a structural diagram of a cruise apparatus of a heavy pan-tilt according to an embodiment of the present application. As shown in FIG. 7, the cruise apparatus of a heavy pan-tilt head includes a starting preset position determination module 710, a stop preset position determination module 720, and a rotation control module 730.

The starting preset position determination module 710 is configured to determine a starting preset position of the heavy pan-tilt performing a preset position cruise in a current unit rotation stage of a current pan-tilt cruise cycle. One unit rotation stage corresponds to one rotation.

The stop preset position determination module 720 is configured to take the starting preset position as a stop starting point and determine at least two stop preset positions of the heavy pan-tilt in the current unit rotation stage from preset positions divided in advance. Two adjacent stop positions in the same unit rotation stage are spaced by a preset number of preset positions.

The rotation control module 730 is configured to control the heavy pan-tilt to rotate sequentially on the at least two stop preset positions of the current unit rotation stage and enter a next unit rotation stage of the current pan-tilt cruise cycle to rotate after one sequential rotation. The minimum operating speed of the heavy pan-tilt rotating sequentially on the at least two stop preset positions is greater than or equal to the minimum operating speed required for the ink formation of a motor bearing.

For example, a pan-tilt cruise shooting region of the heavy pan-tilt is divided into a plurality of target regions. The size of each target region is configured through an operating angle corresponding to one rotation of the heavy pan-tilt. Each target region is sequentially provided with at least two preset positions.

For example, the starting preset position determination module 710 is configured to perform the steps below.

If the current unit rotation stage is a first rotation stage of the current pan-tilt cruise cycle, a first preset position is selected from at least two preset positions sequentially set in a target region to serve as the starting preset position for performing the preset position cruise in the current unit rotation stage.

If the current unit rotation stage is a non-first rotation stage of the current pan-tilt cruise cycle, a preset position after a starting preset position for performing a preset position cruise in a previous unit rotation stage is selected from at least two preset positions sequentially set in a target region to serve as the starting preset position for performing the preset position cruise in the current unit rotation stage.

For example, the rotation control module 730 includes a target region control unit.

The target region control unit is configured to control, according to a preset operating speed, the heavy pan-tilt to rotate sequentially on each stop preset position selected from each target region in the current unit rotation stage.

For example, the target region control unit includes a preset position number determination sub-unit and an operating speed determination sub-unit.

The preset position number determination sub-unit is configured to determine the number of preset positions according to the pan-tilt cruise shooting region and a pan-tilt horizontal field angle.

The operating speed determination sub-unit is configured to calculate and obtain target cruise time according to the number of preset positions, pre-determined preset position stop time, and operating time and determine the preset operating speed by using the target cruise time. The operating time includes the time of the heavy pan-tilt operating in the pan-tilt cruise shooting region. The target cruise time includes the time of the heavy pan-tilt performing cruise detection in a pan-tilt working region.

For example, the target region control unit further includes a current target region movement sub-unit.

The current target region movement sub-unit is configured to control the heavy pan-tilt to move from a stop preset position selected from a current target region to a stop preset position selected from a next target region in the current unit rotation stage until the heavy pan-tilt moves from each stop starting point of each target region to each stop ending point of each target region. A stop ending point is configured to represent an ending preset position of the current target region.

For example, the apparatus further includes a rotation angle determination module and an operating angle determination module.

The rotation angle determination module is configured to acquire a motor rotation acceleration curve of the heavy pan-tilt and determine a rotation angle of the heavy pan-tilt based on the motor rotation acceleration curve.

The operating angle determination module is configured to determine the operating angle according to the rotation angle, the pan-tilt cruise shooting region, and the pan-tilt horizontal field angle.

The above products can execute the method according to embodiments of the present application, and has functional modules and beneficial effects corresponding to the execution method.

An embodiment of the present application further provides a storage medium including computer-executable instructions. The computer-executable instructions are configured to, when executed by a computer processor, perform a cruise method of a heavy pan-tilt. The method includes the steps below.

A starting preset position of the heavy pan-tilt performing a preset position cruise in a current unit rotation stage of a current pan-tilt cruise cycle is determined. One unit rotation stage corresponds to one rotation.

The starting preset position is taken as a stop starting point, and at least two stop preset positions of the heavy pan-tilt in the current unit rotation stage are determined from preset positions divided in advance. Two adjacent stop positions in the same unit rotation stage are spaced by a preset number of preset positions.

The heavy pan-tilt is controlled to rotate sequentially on the at least two stop preset positions of the current unit rotation stage and enter a next unit rotation stage of the current pan-tilt cruise cycle to rotate after one sequential rotation. The minimum operating speed of the heavy pan-tilt rotating sequentially on the at least two stop preset positions is greater than or equal to the minimum operating speed required for the ink formation of a motor bearing.

The storage medium is any one of various types of memory apparatus or storage apparatus. The term "storage medium" is intended to include a mounting medium such as a compact disc read-only memory (CD-ROM), a floppy disk or a magnetic tape device; a computer system memory or a random access memory (RAM) such as a dynamic random access memory (DRAM), a double data rate (DDR) RAM, a static random access memory (SRAM), an extended data output (EDO) RAM or a Rambus RAM; a non-volatile memory such as a flash memory or a magnetic medium (such as a hard disk or an optical storage device); and a register or other similar types of memory elements. The storage medium may further include other types of memories or combinations thereof. In addition, the storage medium may be located in a computer system in which programs are executed, or may be located in a different second computer system connected to the computer system through a network (such as the Internet). The second computer system may provide program instructions to a computer for execution. The term "storage medium" may include two or more storage media which may reside at different positions (such as in different computer systems connected through a network). The storage medium may store program instructions (for example, embodied as computer programs) which are executable by one or more processors.

Certainly, in the storage medium including the computer-executable instructions according to this embodiment of the present application, the computer-executable instructions execute not only cruise operations of a heavy pan-tilt as mentioned above but also related operations in the cruise method of a heavy pan-tilt according to any embodiment of the present application. The computer-readable storage medium may be a non-transient computer-readable storage medium.

Figure 8:
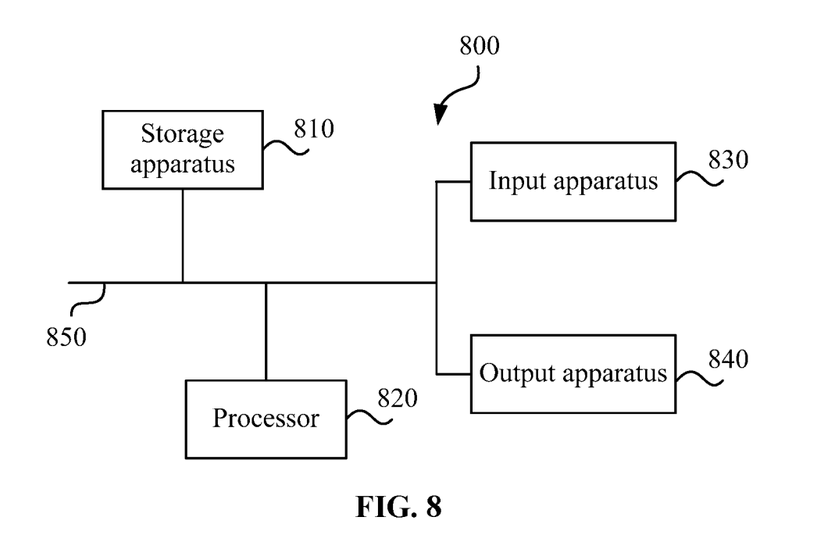
FIG. 8 is a structural diagram of an electronic device according to an embodiment of the present application.

An embodiment of the present application provides an electronic device in which the cruise apparatus of a heavy pan-tilt according to embodiments of the present application may be integrated. FIG. 8 is a structural diagram of an electronic device according to an embodiment of the present application. As shown in FIG. 8, this embodiment provides an electronic device 800. The electronic device 800 includes one or more processors 820 and a storage apparatus 810 configured to store one or more programs. When the one or more programs are executed by the one or more processors 820, the one or more processors 820 are caused to implement the cruise method of a heavy pan-tilt according to embodiments of the present application. The method includes the steps below.

A starting preset position of the heavy pan-tilt performing a preset position cruise in a current unit rotation stage of a current pan-tilt cruise cycle is determined. One unit rotation stage corresponds to one rotation.

The starting preset position is taken as a stop starting point, and at least two stop preset positions of the heavy pan-tilt in the current unit rotation stage are determined from preset positions divided in advance. Two adjacent stop positions in the same unit rotation stage are spaced by a preset number of preset positions.

The heavy pan-tilt is controlled to rotate sequentially on the at least two stop preset positions of the current unit rotation stage and enter a next unit rotation stage of the current pan-tilt cruise cycle to rotate after one sequential rotation. The minimum operating speed of the heavy pan-tilt rotating sequentially on the at least two stop preset positions is greater than or equal to the minimum operating speed required for the ink formation of a motor bearing.

Of course, it is to be understood by those skilled in the art that a processor 820 can also implement technical solutions of the cruise method of a heavy pan-tilt according to embodiments of the present application.

The electronic device 800 shown in FIG. 8 is merely an example and is not intended to limit the function and use scope of embodiments of the present application.

As shown in FIG. 8, the electronic device 800 includes a processor 820, a storage apparatus 810, an input apparatus 830, and an output apparatus 840. One or more processors 820 may be provided in the electronic device. One processor 820 is taken as an example in FIG. 8. The processor 820, the storage apparatus 810, the input apparatus 830, and the output apparatus 540 that are in the electronic device may be connected through a bus or in other manners. FIG. 8 uses the connection through a bus as an example.

The storage apparatus 810 may store one computer-readable storage medium, for example, software programs, computer-executable programs, and module units, such as program instructions corresponding to the cruise method of a heavy pan-tilt in embodiments of the present application.

The memory 810 may mainly include a program storage area and a data storage area. The program storage area may store an operating system and an application program required for implementing at least one function while the data storage area may store data created depending on use of terminals. In addition, the memory 810 may include a high-speed random access memory, and may also include a nonvolatile memory, such as at least one disk memory, flash memory or another nonvolatile solid-state memory. In some examples, the storage apparatus 810 may further include memories disposed remotely relative to the processor 820, and these remote memories may be connected through a network. Examples of the preceding network include, but are not limited to, the Internet, an intranet, a local area network, a mobile communication network and a combination thereof.

The input apparatus 830 may be configured to receive inputted digital information, character information, or voice information and generate key signal input related to user settings and function control of the electronic device. The output apparatus 840 may include a display device such as a display screen and a loudspeaker.

The electronic device according to embodiments of the present application may extend the service life of a heavy pan-tilt motor and reduce after-sales service costs.

The cruise apparatus of a heavy pan-tilt, the medium, and the electronic device according to the preceding embodiments can execute the cruise method of a heavy pan-tilt according to any embodiment of the present application and have function modules and beneficial effects corresponding to this method. For technical details not described in detail in the preceding embodiments, see the cruise method of a heavy pan-tilt according to any embodiment of the present application.

What is claimed is:

1. A cruise method of a heavy pan-tilt, comprising:
   determining a starting preset position of the heavy pan-tilt performing a preset position cruise in a current unit rotation stage of a current pan-tilt cruise cycle, wherein one unit rotation stage corresponds to one rotation;

taking the starting preset position as a stop starting point, and determining at least two stop preset positions of the heavy pan-tilt in the current unit rotation stage from preset positions divided in advance, wherein two adjacent stop positions in a same unit rotation stage are spaced by a preset number of preset positions; and controlling the heavy pan-tilt to rotate sequentially on the at least two stop preset positions of the current unit rotation stage and enter a next unit rotation stage of the current pan-tilt cruise cycle to rotate after one sequential rotation, wherein a minimum operating speed of the heavy pan-tilt rotating sequentially on the at least two stop preset positions is greater than or equal to a minimum operating speed required for ink formation of a motor bearing.

2. The method according to claim 1, wherein a pan-tilt cruise shooting region of the heavy pan-tilt is divided into a plurality of target regions, a size of each target region of the plurality of target regions is configured through an operating angle corresponding to one rotation of the heavy pan-tilt, and the each target region is sequentially provided with at least two preset positions.

3. The method according to claim 2, wherein determining the starting preset position of the heavy pan-tilt performing the preset position cruise in the current unit rotation stage of the current pan-tilt cruise cycle comprises:
in response to determining that the current unit rotation stage is a first rotation stage of the current pan-tilt cruise cycle, selecting a first preset position from the at least two preset positions sequentially set in the each target region to serve as the starting preset position for performing the preset position cruise in the current unit rotation stage; and
in response to determining that the current unit rotation stage is a non-first rotation stage of the current pan-tilt cruise cycle, selecting a preset position after a starting preset position for performing a preset position cruise in a previous unit rotation stage from the at least two preset positions sequentially set in the each target region to serve as the starting preset position for performing the preset position cruise in the current unit rotation stage.

4. The method according to claim 2, wherein controlling the heavy pan-tilt to rotate sequentially on the at least two stop preset positions of the current unit rotation stage comprises:
controlling, according to a preset operating speed, the heavy pan-tilt to rotate sequentially on each stop preset position selected from the each target region in the current unit rotation stage.

5. The method according to claim 4, wherein the preset operating speed is determined in a following manner:
determining a number of preset positions according to the pan-tilt cruise shooting region and a pan-tilt horizontal field angle; and
calculating and obtaining target cruise time according to the number of preset positions, pre-determined preset position stop time, and operating time; and determining the preset operating speed by using the target cruise time, wherein the operating time comprises time of the heavy pan-tilt operating in the pan-tilt cruise shooting region, and the target cruise time comprises time of the heavy pan-tilt performing cruise detection in a pan-tilt working region.

6. The method according to claim 4, wherein controlling the heavy pan-tilt to rotate sequentially on the each stop preset position selected from the each target region in the current unit rotation stage comprises:
controlling the heavy pan-tilt to move from a stop preset position selected from a current target region to a stop preset position selected from a next target region in the current unit rotation stage until the heavy pan-tilt moves from each stop starting point of the each target region to each stop ending point of the each target region, wherein a stop ending point is configured to represent an ending preset position of the current target region.

7. The method according to claim 2, wherein the operating angle is determined in a following manner:
acquiring a motor rotation acceleration curve of the heavy pan-tilt, and determining a rotation angle of the heavy pan-tilt based on the motor rotation acceleration curve; and
determining the operating angle according to the rotation angle, the pan-tilt cruise shooting region, and a pan-tilt horizontal field angle.

8. A non-transitory computer-readable storage medium for storing a computer program, wherein when the computer program is executed by a processor, a cruise method of a heavy pan-tilt is implemented;
wherein the cruise method of a heavy pan-tilt comprises:
determining a starting preset position of the heavy pan-tilt performing a preset position cruise in a current unit rotation stage of a current pan-tilt cruise cycle, wherein one unit rotation stage corresponds to one rotation;
taking the starting preset position as a stop starting point, and determining at least two stop preset positions of the heavy pan-tilt in the current unit rotation stage from preset positions divided in advance, wherein two adjacent stop positions in a same unit rotation stage are spaced by a preset number of preset positions; and
controlling the heavy pan-tilt to rotate sequentially on the at least two stop preset positions of the current unit rotation stage and enter a next unit rotation stage of the current pan-tilt cruise cycle to rotate after one sequential rotation, wherein a minimum operating speed of the heavy pan-tilt rotating sequentially on the at least two stop preset positions is greater than or equal to a minimum operating speed required for ink formation of a motor bearing.

9. An electronic device, comprising a memory, a processor, and a computer program stored in the memory and executable on the processor, wherein the processor, when executing the computer program, implements A cruise method of a heavy pan-tilt;
wherein the cruise method of a heavy pan-tilt comprises:
determining a starting preset position of the heavy pan-tilt performing a preset position cruise in a current unit rotation stage of a current pan-tilt cruise cycle, wherein one unit rotation stage corresponds to one rotation;
taking the starting preset position as a stop starting point, and determining at least two stop preset positions of the heavy pan-tilt in the current unit rotation stage from preset positions divided in advance, wherein two adjacent stop positions in a same unit rotation stage are spaced by a preset number of preset positions; and
controlling the heavy pan-tilt to rotate sequentially on the at least two stop preset positions of the current unit rotation stage and enter a next unit rotation stage of the current pan-tilt cruise cycle to rotate after one sequential rotation, wherein a minimum operating speed of the heavy pan-tilt rotating sequentially on the at least two stop preset positions is greater than or equal to a minimum operating speed required for ink formation of a motor bearing.

10. The non-transitory computer-readable storage medium of claim 8, wherein a pan-tilt cruise shooting region of the heavy pan-tilt is divided into a plurality of target regions, a size of each target region of the plurality of target regions is configured through an operating angle corresponding to one rotation of the heavy pan-tilt, and the each target region is sequentially provided with at least two preset positions.

11. The non-transitory computer-readable storage medium of claim 10, wherein determining the starting preset position of the heavy pan-tilt performing the preset position cruise in the current unit rotation stage of the current pan-tilt cruise cycle comprises:
  in response to determining that the current unit rotation stage is a first rotation stage of the current pan-tilt cruise cycle, selecting a first preset position from the at least two preset positions sequentially set in the each target region to serve as the starting preset position for performing the preset position cruise in the current unit rotation stage; and
  in response to determining that the current unit rotation stage is a non-first rotation stage of the current pan-tilt cruise cycle, selecting a preset position after a starting preset position for performing a preset position cruise in a previous unit rotation stage from the at least two preset positions sequentially set in the each target region to serve as the starting preset position for performing the preset position cruise in the current unit rotation stage.

12. The non-transitory computer-readable storage medium of claim 10, wherein controlling the heavy pan-tilt to rotate sequentially on the at least two stop preset positions of the current unit rotation stage comprises:
  controlling, according to a preset operating speed, the heavy pan-tilt to rotate sequentially on each stop preset position selected from the each target region in the current unit rotation stage.

13. The non-transitory computer-readable storage medium of claim 12, wherein the preset operating speed is determined in a following manner:
  determining a number of preset positions according to the pan-tilt cruise shooting region and a pan-tilt horizontal field angle; and
  calculating and obtaining target cruise time according to the number of preset positions, pre-determined preset position stop time, and operating time; and determining the preset operating speed by using the target cruise time, wherein the operating time comprises time of the heavy pan-tilt operating in the pan-tilt cruise shooting region, and the target cruise time comprises time of the heavy pan-tilt performing cruise detection in a pan-tilt working region.

14. The non-transitory computer-readable storage medium of claim 12, wherein controlling the heavy pan-tilt to rotate sequentially on the each stop preset position selected from the each target region in the current unit rotation stage comprises:
  controlling the heavy pan-tilt to move from a stop preset position selected from a current target region to a stop preset position selected from a next target region in the current unit rotation stage until the heavy pan-tilt moves from each stop starting point of the each target region to each stop ending point of the each target region, wherein a stop ending point is configured to represent an ending preset position of the current target region.

15. The non-transitory computer-readable storage medium of claim 10, wherein the operating angle is determined in a following manner:
  acquiring a motor rotation acceleration curve of the heavy pan-tilt, and determining a rotation angle of the heavy pan-tilt based on the motor rotation acceleration curve; and
  determining the operating angle according to the rotation angle, the pan-tilt cruise shooting region, and a pan-tilt horizontal field angle.

16. The electronic device of claim 10, wherein a pan-tilt cruise shooting region of the heavy pan-tilt is divided into a plurality of target regions, a size of each target region of the plurality of target regions is configured through an operating angle corresponding to one rotation of the heavy pan-tilt, and the each target region is sequentially provided with at least two preset positions.

17. The electronic device of claim 10, wherein determining the starting preset position of the heavy pan-tilt performing the preset position cruise in the current unit rotation stage of the current pan-tilt cruise cycle comprises:
  in response to determining that the current unit rotation stage is a first rotation stage of the current pan-tilt cruise cycle, selecting a first preset position from the at least two preset positions sequentially set in the each target region to serve as the starting preset position for performing the preset position cruise in the current unit rotation stage; and
  in response to determining that the current unit rotation stage is a non-first rotation stage of the current pan-tilt cruise cycle, selecting a preset position after a starting preset position for performing a preset position cruise in a previous unit rotation stage from the at least two preset positions sequentially set in the each target region to serve as the starting preset position for performing the preset position cruise in the current unit rotation stage.

18. The electronic device of claim 10, wherein controlling the heavy pan-tilt to rotate sequentially on the at least two stop preset positions of the current unit rotation stage comprises:
  controlling, according to a preset operating speed, the heavy pan-tilt to rotate sequentially on each stop preset position selected from the each target region in the current unit rotation stage.

\* \* \* \* \*